United States Patent [19]

Annett, II

[11] 4,137,903
[45] Feb. 6, 1979

[54] SOLAR HEAT ABSORBER

[76] Inventor: Charles E. Annett, II, 213 Chardin Dr., Nokomis, Fla. 33555

[21] Appl. No.: 826,259

[22] Filed: Aug. 19, 1977

[51] Int. Cl.² .............................................. F24J 3/02
[52] U.S. Cl. .................................... 126/271; 126/270
[58] Field of Search ............... 126/270, 271; 237/1 A; 285/131, 132, 156

[56] References Cited

U.S. PATENT DOCUMENTS

| | | | |
|---|---|---|---|
| 980,505 | 1/1911 | Emmet | 126/271 |
| 4,016,860 | 4/1977 | Moan | 126/271 |
| 4,018,215 | 4/1977 | Pei | 126/271 |
| 4,048,982 | 9/1977 | Pei | 126/271 |
| 4,048,983 | 9/1977 | Pei | 126/271 |

FOREIGN PATENT DOCUMENTS 716771 10/1954 United Kingdom .................... 285/131

Primary Examiner—Kenneth W. Sprague
Assistant Examiner—James C. Yeung

[57] ABSTRACT

A solar heat absorber, generally used in series, induces relatively high temperatures in a liquid or gas medium from the sun's rays at any angle above the horizon. The absorber consists of a substantially spherical vessel made of a transparent material encasing one or more similar but somewhat smaller vessels, all of which are provided with an opening or neck, the outer one of which overlaps the inner one and is sealed thereto. The annular space or spaces between the vessels are evacuated of air thereby insulating the inner vessel against heat loss to the atmosphere. One surface of the inner vessel is coated with a solar heat absorbing material or the vessel material is integrally colored. The combined vessels are sealed at the neck to a tubular fitting having longitudinal passages for supplying a heat transfer medium to, and discharging it from, the inner vessel. The supply passage may be provided at its upper end with a deflector or spray nozzle to assist in circulation of the medium and to assure its complete absorbtion of the available solar heat. In operation any desired number of such devices are connected in series to a pipeline by means of tee connectors which are provided with internal channels directing incoming heat transfer medium into and out of the tubular fittings. When a medium is forced thru the series of units by outside means it is progressively heated by each absorber in the system. In this manner the temperature of the medium may be raised any practical amount limited only by the strength of the materials used in the system and the systems' inherent heat loss characteristics.

3 Claims, 6 Drawing Figures

U.S. Patent  Feb. 6, 1979  4,137,903
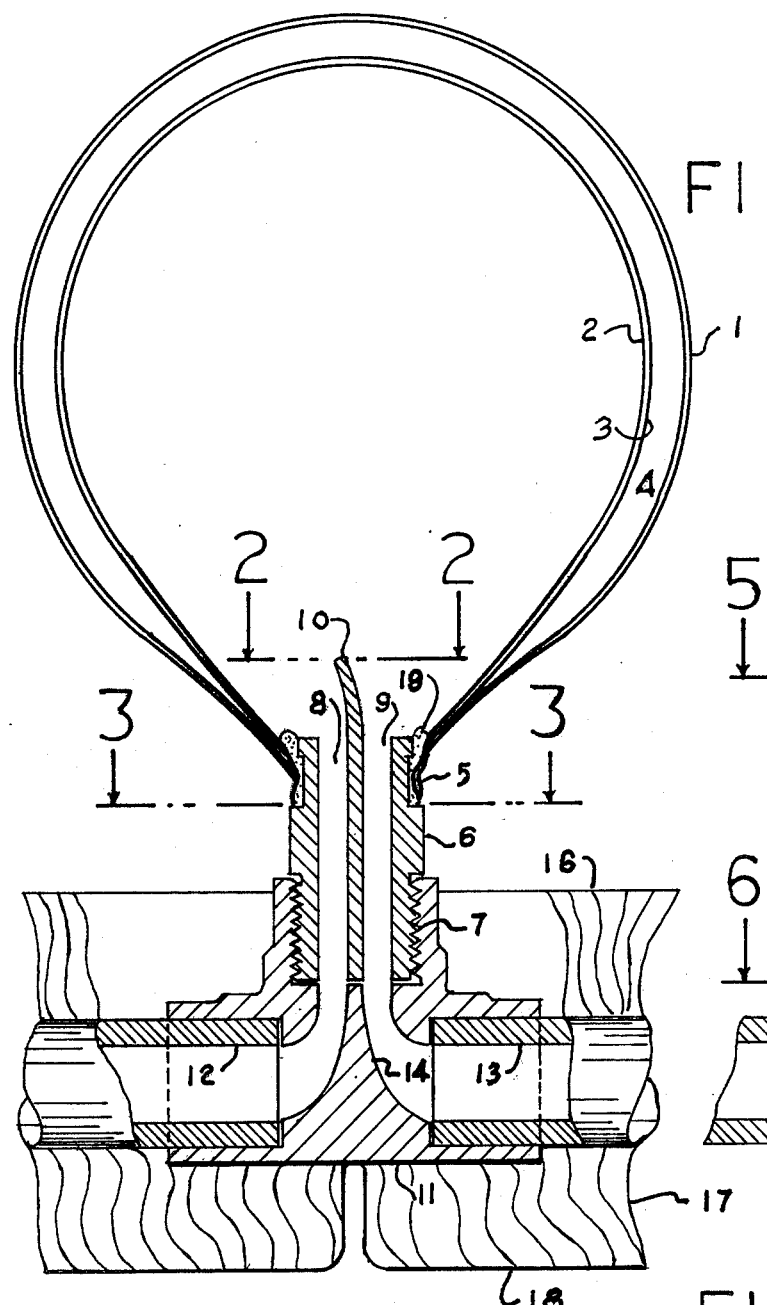
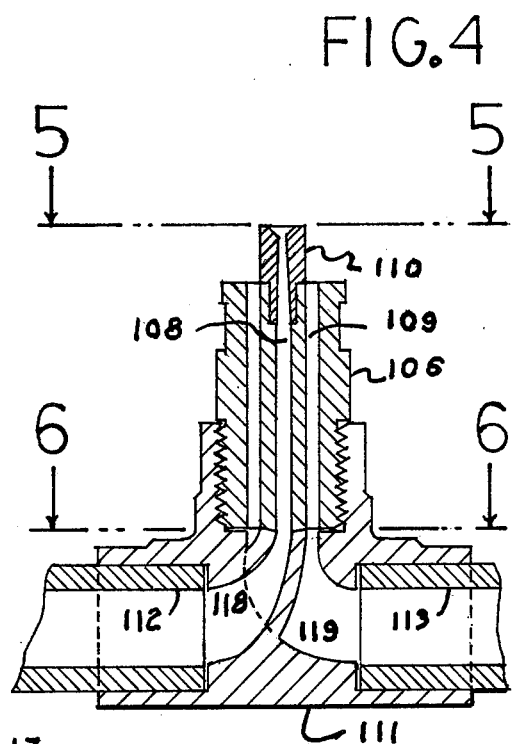
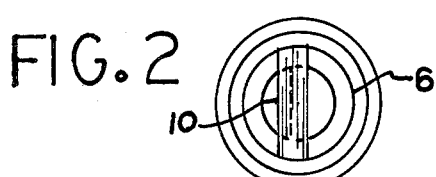
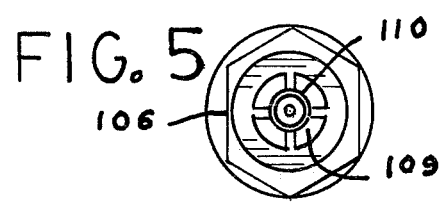
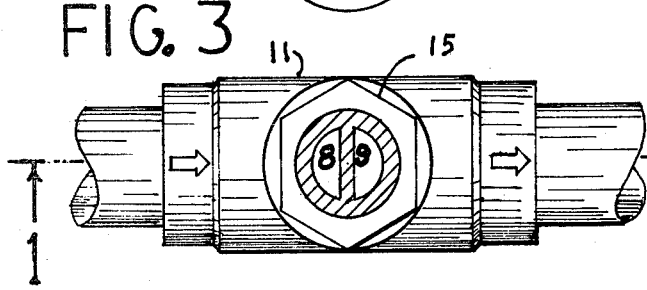
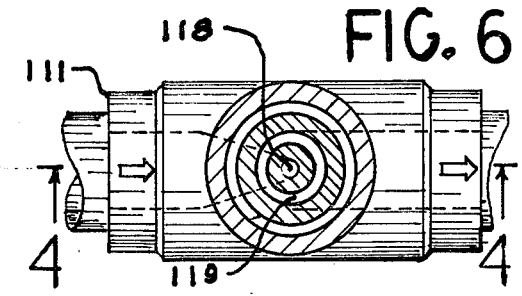

SOLAR HEAT ABSORBER

CROSS REFERENCES

There are many absorber devices available to extract heat from solar energy, the vast majority of which are classified as flat-plate collectors typically containing a transparent insulating cover, dark color pipe coils or flat formed metal coils circulating a heat absorbing medium, insulated bottom and sides, and supply and return piping. Other designs contain rows of insulated transparent tubes surrounding an inner tube with selective coating the space between being evacuated. All connected to piping headers, and having various means of circulating a medium therein. Most of these absorbers are limited to temperatures of about 250 degrees F. (121 degrees C.) and for maximum efficiency must be arranged facing south tilted at an angle equal to the local latitude plus about 15 degrees. There are also many various types of concentrating collectors available which can attain temperatures well above this but these must be designed to follow the sun by mechanical means at considerable added initial expense and continuing maintenance expense.

BRIEF SUMMARY OF THE INVENION

The object of this invention is a solar heat absorbing device which may be mass produced on modern high speed equipment, in various sizes, at reasonable cost, and which may adapt to a simple pipe system using mainly readily available fittings and technology. The use of these devices in series permits attaining relatively high temperatures greatly expanding the application of solar energy for use in absorbtion cooling and other known processes. Furthermore, energy stored in any medium at elevated temperatures reduces the volume of medium required compared to lower temperatures.

BRIEF DESCRIPTION OF THE DRAWINGS

FIG. 1 is a cross section thru the center of one embodiment of this invention, taken along line 1—1 of FIG. 3:

FIG. 2 is a view taken at line 2—2 looking down in FIG. 1;

FIG. 3 is a sectional view taken at line 3—3 shown in FIG. 1;

FIG. 4 is a cross section thru the center of another embodiment of this invention, taken along line 4—4 of FIG. 6;

FIG. 5 is a view taken at line 5—5 looking down in FIG. 4;

FIG. 6 is a sectional view taken at line 6—6 shown in FIG. 4.

DETAILED DESCRIPTION

The preferred embodiment of this invention is a substantially spherical shaped absorber attached to a tubular fitting, which when exposed to sun light will collect the heat of radiation and transfer it to a liquid or gas medium which is introduced thru a connecting pipe system, and a means of deploying numerous such absorbers along said pipe system by means of connecting fittings which enable the medium to be transported from a source, thru multiple absorbers which when arranged in series will progressively heat the medium to a higher temperature.

Referring to FIG. 1, the absorber consists of an outer vessel 1 composed of clear low-iron glass or other transparent material specifically designed to admit a high percent of sun light in the wavelength of 0.3 to 2.3 microns of the solar radiation spectrum. A second inner vessel 2 is provided within the outer vessel composed of glass or other substantial material which will absorb the heat of radiation transmitted through the outer vessel 1, either directly from the sun or reflected from other surfaces, when the material, if transparent, is coated 3, preferably on the outside, with a heat absorbing material such as dark color paint or when the material is intergrally dark colored. The space 4 between the inner and outer vessels should preferably be at least ¼" wide and evacuated of most of the entraped air in order to reduce heat loss from the inner vessel, the inner and outer vessels being hermetically sealed together at their necks 5.

The inside of the combined necks are effectively sealed with a bonding compound 19 to a tubular fitting 6 which is composed of a substantial material, which can be readily cast or formed, such as PVC plastic, rubber, brass, or other metals. This fitting is provided on its lower extremity with a threaded connection 7 designed to fit standard female pipe fittings so as to be readily removable if replacement is required. However if the outer vessel 1 is composed of a non-breakable material such as high-stress glass the fitting may be provided with a glued or soldered slip connection. Fitting 6 is additionally provided with longitudinal tubes; 8 to permit the heat transfer medium to enter the inner vessel 2; and 9 to permit the medium to exit. The upper end of tube 8 may be provided with a deflector 10 which directs the medium against the inner surface of vessel 2 to assist the medium in spreading out over the entire surface.

Fitting 11 is a standard tee pipe fitting provided with either threaded or slip female ends as required to accomodate tubular fitting 6 and system incoming pipe 12 and discharge pipe 13, except that in order to direct the medium form pipe 12 into tube 8 of fitting 6 and exiting medium from tube 9 into pipe 13, a diverting flume 14 is placed within the usual main stream of fitting 11. Alternate means of accomplishing this will be readily apparant to anyone versed in the art of pipe design.

FIG. 2 is a view looking down along line 2—2 showing the tope of tubular fitting 6 and deflector 10.

FIG. 3 is a section thru tubular fitting 6 showing its relation in plan to tee fitting 11 which is provided with arrows indicating the direction of flow of the medium so that the installer can properly orient deflector piece 10 similarly marked in fitting 6 in the direction shown in FIG. 1. To facilitate this and to aid in tightening fitting 6 is provided with a hexangular section 15 to accomodate a standard flat wrench. Supply tube 8 and exit tube 9 are shown in section.

FIG. 4 shows a section thru the centerline of a center supply tubular fitting 106 and tee pipe fitting 111 generally used where it is desired to attain high temperatures and less volume of heat absorber medium. Nozzle 110 may be substituted in place of the deflector 10 and supply tube 108 may take the form of a cylinder tapped at the top to receive the nozzle which projects above the top of fitting 106. Tee fitting 111 is provided with channel 118 to divert the medium from supply pipe 112 to center tube 108 of fitting 106 and with channel 119 to return the medium from surrounding tubes 109 to discharge pipe 113.

FIG. 5 is a plan view of tubular fitting 106 looking down at line 5—5, showing nozzle 110 with supply opening at its center and return tubes 109 surrounding it, while FIG. 6 is a section thru the stem of tee fitting 111 showing supply channel 118 and discharge channel 119 at the junction with tubular fitting 106.

It will be apparent to anyone knowledgeable in the field that the maximum size of vessels 1 and 2 must be limited in order to produce them on production machinery at reasonable cost. Therefore this device is used in series where high temperatures and substantial quantities of heated medium are to be attained. FIGS. 1 and 4 show but a single component of such an arrangement. To form a system capable of high temperature and quantity output multiple units are connected together by extending pipes 12 and 13 or 112 and 113 to any desired length and connecting them to similar assemblages. They may be laid out in series to obtain the desired temperature of the medium and two or more groups in series may be connected to incoming and outgoing headers to supply and recover the total medium heat from all units. Any convenient number and arrangement may be formed into a single panel having supply and exit connections to fit similar panels or to connect to a system which may include pumps or blowers, heat exchangers, heat sinks, and other devices familiar to those versed in the art of thermology.

A section thru a typical panel is shown in FIG. 1 and may be composed of a reflective top surface 16 which will direct the sun rays towards the underside of the absorbers and which may be waterproof to form a roof, insulation 17, and a structural supporting material 18 such as commonly used aluminum or steel metal deck.

Although the preferred embodiment of vessels 1 and 2 is a sphere with an opening formed into a neck, they may be modified, in order to attain mass production efficiency, to the shape of a hemisphere on the top transforming gradually to a neck in a manner similar to electric light bulbs without materially impairing efficiency, or with slight impairment of total heat gain, in the shape of cylinder with hemisphere top.

A panel arrangement of absorbers spaced two diameters apart along a collector pipe and parallel to similarly spaced absorbers on adjacent pipes but offset one from another in an equalateral triangle manner, when laid on a level surface and the sun is at an altitude of 30 degrees or higher, no shadow from one will fall upon the spherical part of another there-by blocking its exposure to the sun. Moreover, as the sun rises beyond 30 degrees and becomes more intense, rays not striking the absorbers directly will reflect from panel surface 16 and strike the under side of spheres and necks so that when the sun is at an altitude of 60 degrees and above, with the reflective surface, more than two thirds of the total surface of the devices will be in direct or reflected sun light. If desired the panels may be sloped towards the sun but would then lose the early morening and late afternoon sun light during the summer amplitude.

I claim:

1. A solar heat absorber comprising:
   an essentially spherical transparent vessel provided with an open neck on its surface,
   a smaller essentially spherical vessel having a solar heat absorbing coating thereon located within the aforesaid transparent vessel, means to provide a smaller open neck on said smaller spherical vessel, the neck of the smaller spherical vessel being hermetically sealed to the neck of the surrounding vessel and the means forming a vacuum in the space between said vessels,
   a tubular solar heat absorber fitting, means on one end of said fitting for sealing and fitting with the neck of said smaller vessel, the other end of said fitting being provided with first pipe connecting means, means forming first and second open end longitudinal tubes within said fitting, said first tube having a deflector at the inner end extending a substantial distance into said smaller vessel, both first and second tubes extending throughout the length of the fitting,
   a longitudinal cylindrical tee-type pipe fitting with second pipe connecting means on either end, said pipe fitting being provided with a stem, and means for possitioning said stem at the mid-point of the pipe fitting, said stem has a similar tube normal to said longitudinal cylindrical pipe fitting and extending away therefrom and therminating in a mating means with the first pipe connecting means end of the tubular solar heat absorber fitting,
   said longitudinal cylindrical pipe fitting being provided with a diverting flume at the positioning means so as to form first and second flow channels,
   means to align said first longitudinal cylindrical tube on the opposite end of said first flow channel,
   means to aligh said second longitudinal cylindrical tube on the opposite end of said second flow channel,
   a heat transfer medium and means to conduct the medium under pressure through the first flow channel into said first longitudinal cylindrical tube of the solar absorber fitting, through the outer end of the first longitudinal tube which is provided with a deflector, to deflect the medium against the inner surface of the smaller cylindrical vessel so as to absorb the solar heat from the smaller cylindrical vessel, and from the smaller cylindrical vessel, the heated medium is discharged through the second longitudinal cylindrical tube and out of the opposite end of the second flow channel of the longitudinal cylindrical pipe fitting to an area of reduced pressure.

2. The apparatus of claim 1, wherein the tubular solar heat absorber fitting further having a concentric outer tube and a central tube, said central tube being connected longitudinally within said concentric outer tube, both said concentric outer tube and said central tube extending the length of the fitting, the central tube being terminated in a nozzle at the inner end extending a substantial distance into said smaller vessel.

3. The apparatus of claim 2, wherein the tubular solar heat absorbing fitting further includes a second diverting flume, means to align said second diverting flume with the outer concentric tube so as to form a channel to the inner end of the second opposite pipe connecting means, permitting a heat transfer medium under pressure to be directed from one side of the pipe fitting into the connected solar heat absorber fitting and to exit through the opposite end of the pipe fitting.

* * * * *